(12) United States Patent
Park et al.

(10) Patent No.: US 12,689,041 B2
(45) Date of Patent: Jul. 21, 2026

(54) SEPARATOR MODULE FOR FUEL CELLS AND UNIT CELL FOR FUEL CELLS INCLUDING THE SAME

(71) Applicants: Hyundai Motor Company, Seoul (KR); Kia Corporation, Seoul (KR)

(72) Inventors: Kyeong Cheol Park, Yongin-si (KR); Sang Mun Jin, Yongin-si (KR); Jin Hyeok Yoo, Yongin-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 515 days.

(21) Appl. No.: 17/983,632

(22) Filed: Nov. 9, 2022

(65) Prior Publication Data

US 2024/0014412 A1    Jan. 11, 2024

(30) Foreign Application Priority Data

Jul. 6, 2022    (KR) .......................... 1020220083289

(51) Int. Cl.
*H01M 8/0265* (2016.01)
*H01M 8/023* (2016.01)
*H01M 8/2484* (2016.01)

(52) U.S. Cl.
CPC ......... *H01M 8/0265* (2013.01); *H01M 8/023* (2013.01); *H01M 8/2484* (2016.02)

(58) Field of Classification Search
CPC ............. H01M 8/0265; H01M 8/0247; H01M 8/2483; H01M 8/0258; H01M 8/023; H01M 8/0232; H01M 8/0273; H01M 8/0276
See application file for complete search history.

(56) References Cited

U.S. PATENT DOCUMENTS

| | | | |
|---|---|---|---|
| 2003/0003342 A1* | 1/2003 | Sugita ................. | H01M 8/1004 |
| | | | 429/481 |
| 2004/0137303 A1* | 7/2004 | Kuroki ................ | H01M 8/0276 |
| | | | 429/509 |
| 2009/0098434 A1* | 4/2009 | Sano .................... | H01M 4/8885 |
| | | | 429/480 |
| 2009/0226786 A1* | 9/2009 | Selcuk ................ | H01M 8/0271 |
| | | | 429/495 |

(Continued)

FOREIGN PATENT DOCUMENTS

| | | |
|---|---|---|
| KR | 1230892 B1 | 2/2013 |
| KR | 1449193 B1 | 10/2014 |

*Primary Examiner* — Helen Oi K Conley
*Assistant Examiner* — Amanda Rosenbaum
(74) *Attorney, Agent, or Firm* — Fish & Richardson P.C.

(57) ABSTRACT

Disclosed are a separator module for fuel cells which may reduce pressure loss and improve flow distribution in a separator, and a unit cell for fuel cells including the separator module. The separator module includes a separator main body including a pair of manifold parts formed at both ends of the separator main body and having a plurality of manifolds, a main body reaction part formed between the pair of manifold parts such that reaction gas flows in the main body reaction part, and a pair of main body diffusion parts formed between the main body reaction part and the pair of manifold parts such that the reaction gas is diffused in the main body diffusion parts, and a porous body disposed on one surface of the separator main body in a region corresponding to the main body reaction part and the pair of main body diffusion parts.

5 Claims, 8 Drawing Sheets

(56)        References Cited

U.S. PATENT DOCUMENTS

2010/0183944 A1 *    7/2010   Ogawa ................ H01M 8/0247
                                                            429/483
2013/0065156 A1 *    3/2013   Jeong .................. H01M 8/0258
                                                            429/482
2016/0164122 A1 *    6/2016   Jin ...................... H01M 8/0258
                                                            429/513
2016/0181631 A1 *    6/2016   Jang .................... H01M 8/2483
                                                            429/434
2021/0184230 A1 *    6/2021   Jeong ................. H01M 8/0204
2021/0336279 A1 *   10/2021   Fujii ................... H01M 8/0256

* cited by examiner

-RELATED ART-

-RELATED ART-

-RELATED ART-

_120_

SEPARATOR MODULE FOR FUEL CELLS AND UNIT CELL FOR FUEL CELLS INCLUDING THE SAME

CROSS-REFERENCE TO RELATED APPLICATION

This application claims priority from Korean Patent Application No. 10-2022-0083289, filed on Jul. 6, 2022, in the Korean Intellectual Property Office, the disclosure of which is incorporated herein by reference in its entirety.

TECHNICAL FIELD

The present disclosure relates to a separator module for fuel cells and a unit cell for fuel cells including the same, and more particularly, to a separator module for fuel cells which may reduce pressure loss and improve flow distribution in a separator, and a unit cell for fuel cells including the separator module.

BACKGROUND

In general, a fuel cell is a kind of power generation device that converts the chemical energy of a fuel into electric energy through electrochemical reactions in a stack, and may be used not only to supply industrial driving power, driving power for home use and driving power for vehicles, but also to supply power to small electronics, such as portable devices, and the application range of fuel cells is gradually expanding as a high-efficiency clean energy source now.

In general, a fuel cell stack includes a membrane-electrode assembly (MEA) located at the innermost region thereof, and the MEA includes a polymer electrolyte membrane designed to conduct protons, and catalyst layers, i.e., a cathode and an anode, applied to both surfaces of the electrolyte membrane so that hydrogen and oxygen react therewith.

Further, gas diffusion layers (GDLs) are stacked on the outer portions of the MEA where the cathode and the anode are located, separators having flow fields through which a fuel is supplied and water generated by reactions is discharged are located outside the GDLs such that gaskets are interposed between the separators and the GDLs, and end plates configured to support and fix the above-described elements are coupled to the outermost portions of the MEA.

Therefore, on the anode side of the fuel cell stack, the oxidation reaction of hydrogen occurs and thus produces protons and electrons, and the generated protons and electrons migrate to the cathode through the electrolyte membrane and an external circuit, respectively, and water is produced through electrochemical reactions among the protons and the electrons migrated from the anode and oxygen in the air, and electric energy is generated due to the flow of the electrons, simultaneously, on the cathode.

In general, the separator is manufactured in a structure in which lands pressed against the GDL so as to be supported thereby and channels (flow fields) serving as the flow paths of a fluid are repeatedly formed.

That is, in the general separator having a repeatedly bent structure in which the lands and the channels are repeatedly formed, the channels on one surface of the separator facing the GDL are used as spaces in which reaction gas, such as hydrogen or air, flows, the channels on the other surface of the separator are used spaces in which a coolant flows, and thereby, one unit cell may include two separators, i.e., the separator having hydrogen and coolant channels, and the separator having air and coolant channels.

Recently, a porous separator configured such that reaction gas forms a turbulence and is more easily diffused into the GDL compared to the conventional general separator is being used.

FIG. 1 is an exploded perspective view showing a unit cell for fuel cells to which a general porous separator is applied, FIG. 2A is a perspective view showing the general porous separator, and FIG. 2B is a cross-sectional view showing an essential portion of the general porous separator. Here, FIG. 2B is a cross-sectional view taken along line A-A of FIG. 2A.

As described above, the unit cell for fuel cells to which the general porous separator is applied, as shown in FIGS. 1 to 2B, includes a membrane-electrode assembly (MEA) 10, a pair of gas diffusion layers (GDLs) disposed on both surfaces of the MEA 10, and a pair of separators 20 and 50 disposed outside the pair of GDLs. Here, among the pair of separators 20 and 50, a porous separator 20 is applied as at least one separator, preferably, a cathode separator.

The MEA and the GDLs of the unit cell of the above-described general fuel cell stack are applied as the MEA 10 and the GDLs of the unit cell for fuel cells to which the general porous separator is applied, and a detailed description thereof will thus be omitted.

However, in order to easily handle the MEA 10 and to facilitate alignment and adhesion of the MEA 10 with and to the separators 20 and 50, frames (hereinafter, referred to as "sub-gaskets") 11 which surround and support the edge of the MEA 10 may be provided.

Further, the porous separator 20 applied as the cathode separator includes a flat plate-type separator main body 30, and a porous body 40.

Here, the separator main body 30 serves as a sealing partition configured to divide a region in which the reaction gas flows, and includes a pair of manifold parts 30c formed at both ends of the separator main body 30 and having a plurality of manifolds 33 configured such that the reaction gas is introduced therethrough and discharged therefrom, a main body reaction part 30a formed between the pair of manifold parts 30c such that the reaction gas flows in the main body reaction part 30a, and a pair of main body diffusion parts 30b formed between the main body reaction part 30a and the pair of manifold parts 30c such that the reaction gas is diffused in the main body diffusion parts 30b.

Here, diffusion lands 31 serving as supports and diffusion channels 32 serving as flow paths of the reaction gas are alternately formed in the main body diffusion parts 30b, so as to allow the reaction gas to be gradually diffused while flowing in the direction toward the main body reaction part 30a, and the diffusion lands 31 support the sub-gaskets 11 when the sub-gaskets 11 are pressed against the separator main body 300.

Further, the porous body 40 serves to induce smooth diffusion and flow of the reaction gas, and has a waveform cross-section in the flow direction of the reaction gas, and a plurality of flow holes through which the reaction gas passes is formed in zigzags in the porous body 40.

Here, the porous body 40 is formed to have a shape and a size corresponding to the main body reaction part 30a of the separator main body 30, and is pressed against the main body reaction part 30a of the separator main body 30.

On the other hand, the general flow channel-type separator 50 applied as an anode separator is manufactured to have a structure in which lands 51 pressed against the GDL or the sub-gaskets 11 so as to be supported thereby and channels 52 serving as flow paths of the reaction gas are repeatedly formed.

In the same manner as the separator main body 30 of the porous separator 20, the general flow channel-type separator 50 includes a pair of manifold parts 50c formed at both ends of the separator 50 and having a plurality of manifolds 53 configured such that the reaction gas is introduced thereinto and discharged therefrom, a reaction part 50a formed between the pair of manifold parts 50c such that the reaction gas flows in the reaction part 50a, and a pair of diffusion parts 50b formed between the reaction part 50a and the pair of manifold parts 50c such that the reaction gas is diffused in the diffusion parts 50b.

As shown in FIG. 2B, the general porous separator 20 is formed in a structure in which the porous body 40 has a shape and a size corresponding to the main body reaction part 30a of the separator main body 30, and is pressed against the main body reaction part 30a of the separator main body 30, and the porous body 40 is not disposed on the main body diffusion parts 30b.

Thereby, the main body diffusion parts 30b, on which the porous body 40 is not disposed, are directly pressed against the sub-gaskets 11, the diffusion channels 32 are formed in the main body diffusion parts 30b, and thus, regions in which the main body diffusion parts 30b and the sub-gaskets 11 are not pressed against each other occur.

In these regions in which in which the main body diffusion parts 30b and the sub-gaskets 11 are not pressed against to each other, the sub-gaskets 11 may clog some parts of spaces in which the diffusion channels 32 of the main body diffusion parts 30b are formed due to a pressure difference between the porous separator 20 applied as the cathode separator and the flow channel-type separator 50 applied as the anode separator, and may thus reduce the flow of the reaction gas. Such clogging of the flow spaces of the main body diffusion parts 30b causes problems, such as pressure loss, distribution deterioration, etc., and thus reduces the output of the fuel cell.

The above information disclosed in the Background section is only for enhancement of understanding of the background of the disclosure and should not be interpreted as conventional technology that is already known to those skilled in the art.

SUMMARY

Therefore, the present disclosure has been made in view of the above problems, and it is an object of the present disclosure to provide a separator module for fuel cells which may prevent flow spaces of main body diffusion parts of a separator main body from being clogged by forming porous body diffusion parts on a porous body in the same manner as the separator main body, so as to reduce pressure loss and to improve flow distribution in the separator module, and a unit cell for fuel cells including the separator module for fuel cells.

In accordance with an aspect of the present disclosure, the above and other objects can be accomplished by the provision of a separator module for fuel cells, including a separator main body including a pair of manifold parts formed at both ends of the separator main body and having a plurality of manifolds configured such that reaction gas is introduced thereinto and discharged therefrom, a main body reaction part formed between the pair of manifold parts such that the reaction gas flows in the main body reaction part, and a pair of main body diffusion parts formed between the main body reaction part and the pair of manifold parts such that the reaction gas is diffused in the main body diffusion parts, and a porous body disposed on one surface of the separator main body in a region corresponding to the main body reaction part and the pair of main body diffusion parts of the separator main body.

The porous body may be divided into a porous body reaction part formed in a region corresponding to the main body reaction part of the separator main body, and having a plurality of flow holes configured such that the reaction gas passes therethrough, and porous body diffusion parts configured to extend from both ends of the porous body reaction part up to regions corresponding to the main body diffusion parts of the separator main body.

Diffusion channels and diffusion lands may be alternately formed in the main body diffusion parts of the separator main body so as to allow the reaction gas to be gradually diffused while flowing in a direction toward the main body reaction part, and the porous body diffusion parts of the porous body may be formed to come into contact with the diffusion lands so as to be supported thereby.

The porous body diffusion parts of the porous body may be formed in a shape of a flat plate.

A plurality of flow holes configured such that the reaction gas passes therethrough may be formed in the porous body diffusion parts of the porous body.

A plurality of punched holes configured to pass through one surface and a remaining surface of the porous body may be formed in the porous body diffusion parts of the porous body.

Prominences and depressions may be repeatedly formed in a flow direction of the reaction gas on the porous body reaction part of the porous body to form a waveform cross-section, and the plurality of flow holes may be arranged in a zigzag pattern in the flow direction of the reaction gas in the porous body reaction part of the porous body.

In accordance with another aspect of the present disclosure, there is provided a unit cell for fuel cells, including a membrane-electrode assembly (MEA), a pair of gas diffusion layers (GDLs) disposed on both surfaces of the MEA, and a pair of separators disposed outside the pair of GDLs, wherein, among the pair of separators, at least one separator is provided as a porous separator module, and the porous separator module includes separator main body including a pair of manifold parts formed at both ends of the separator main body and having a plurality of manifolds configured such that reaction gas is introduced thereinto and discharged therefrom, a main body reaction part formed between the pair of manifold parts such that the reaction gas flows in the main body reaction part, and a pair of main body diffusion parts formed between the main body reaction part and the pair of manifold parts such that the reaction gas is diffused in the main body diffusion parts, and a porous body disposed on one surface of the separator main body in a region corresponding to the main body reaction part and the pair of main body diffusion parts of the separator main body.

The porous body may be divided into a porous body reaction part formed in a region corresponding to the main body reaction part of the separator main body, and having a plurality of flow holes configured such that the reaction gas passes therethrough, and porous body diffusion parts configured to extend from both ends of the porous body reaction part up to regions corresponding to the main body diffusion parts of the separator main body.

The unit cell for fuel cells may further include sub-gaskets configured to surround and support an edge of the MEA, and provided in regions corresponding to the pair of main body diffusion parts of the separator main body, and the porous body diffusion parts of the porous body may be formed between the pair of main body diffusion parts of the separator main body and the sub-gaskets.

Diffusion channels and diffusion lands may be alternately formed in the main body diffusion parts of the separator main body so as to allow the reaction gas to be gradually diffused while flowing in a direction toward the main body reaction part, and the porous body diffusion parts of the porous body may be formed such that both side surfaces thereof come into contact with the sub-gaskets and the diffusion lands so as to be supported thereby.

The porous body diffusion parts of the porous body may be formed in a shape of a flat plate.

A plurality of flow holes configured such that the reaction gas passes therethrough may be formed in the porous body diffusion parts of the porous body.

A plurality of punched holes configured to pass through one surface and a remaining surface of the porous body may be formed in the porous body diffusion parts of the porous body.

Prominences and depressions may be repeatedly formed in a flow direction of the reaction gas on the porous body reaction part of the porous body to from a waveform cross-section, and the plurality of flow holes may be arranged in a zigzag pattern in the flow direction of the reaction gas in the porous body reaction part of the porous body.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Reference will now be made in detail to exemplary implementations of the present disclosure, examples of which are illustrated in the accompanying drawings. Wherever possible, the same reference numbers will be used throughout the drawings to refer to the same or like parts.

In the following description of the implementations, suffixes, such as "module", "part" and "unit", are provided or used interchangeably merely in consideration of ease in statement of the specification, and do not have meanings or functions distinguished from one another.

In the following description of the implementations of the present disclosure, a detailed description of known functions and configurations incorporated herein will be omitted when it may make the subject matter of the present disclosure rather unclear. Further, the accompanying drawings will be exemplarily given to describe the implementations of the present disclosure, and should not be construed as being limited to the implementations set forth herein, and it will be understood that the implementations of the present disclosure are provided only to completely disclose the disclosure and cover modifications, equivalents or alternatives which come within the scope and technical range of the disclosure.

In the following description of the implementations, terms, such as "first" and "second", are used only to describe various elements, and these elements should not be construed as being limited by these terms. These terms are used only to distinguish one element from other elements.

When an element or layer is referred to as being "connected to" or "coupled to" another element or layer, it may be directly connected or coupled to the other element or layer, or intervening elements or layers may be present. In contrast, when an element or layer is referred to as being "directly connected to" or "directly coupled to" another element or layer, there may be no intervening elements or layers present.

As used herein, singular forms may be intended to include plural forms as well, unless the context clearly indicates otherwise.

In the following description of the implementations, the terms "comprises," "comprising," "including," and "having" are inclusive and therefore specify the presence of stated features, integers, steps, operations, elements, components, and/or combinations thereof, but do not preclude the presence or addition of one or more other features, integers, steps, operations, elements, components, and/or combinations thereof.

Figure 1:
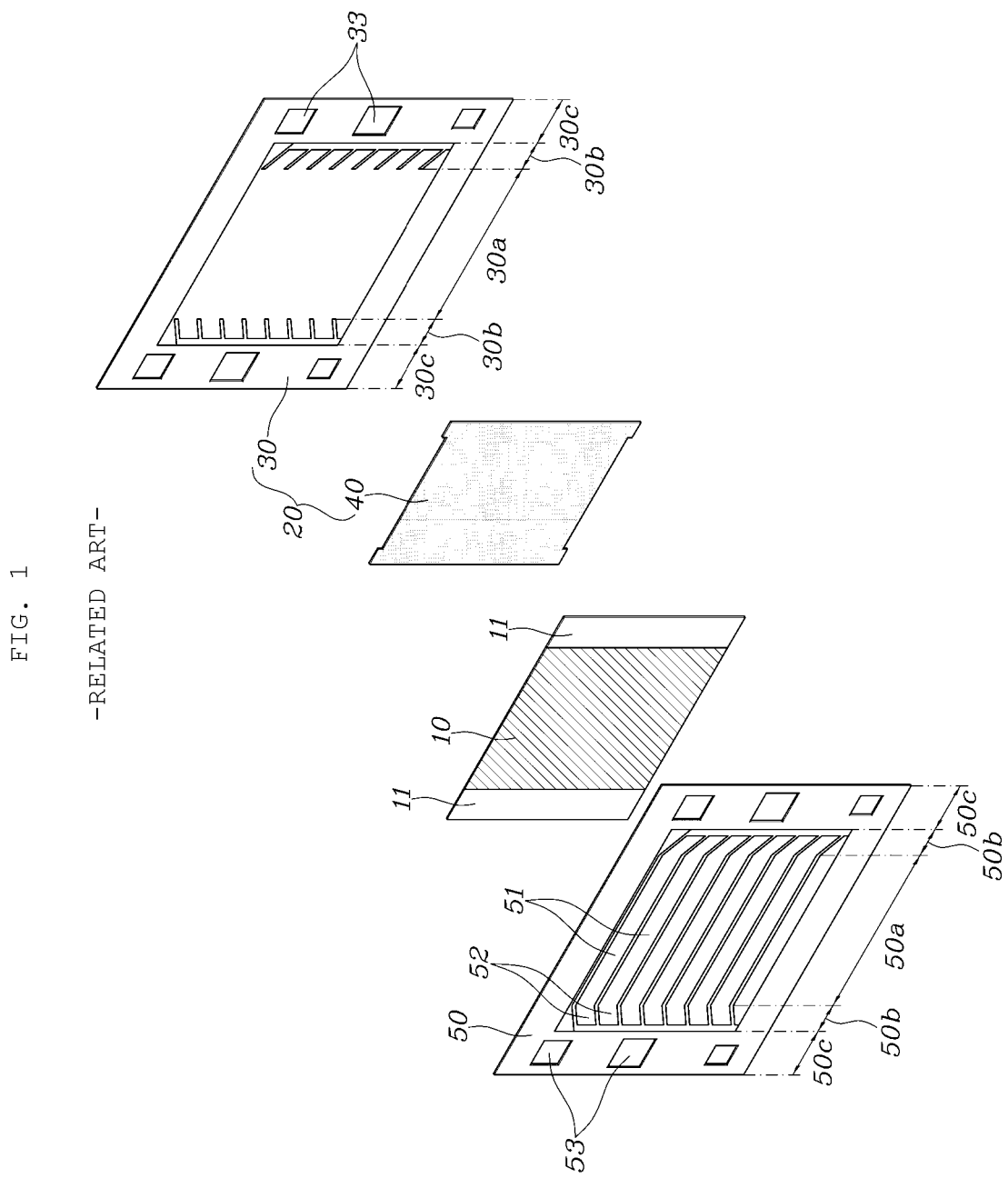
FIG. 1 is an exploded perspective view showing a unit cell for fuel cells to which a general porous separator is applied.
Figure 2A:
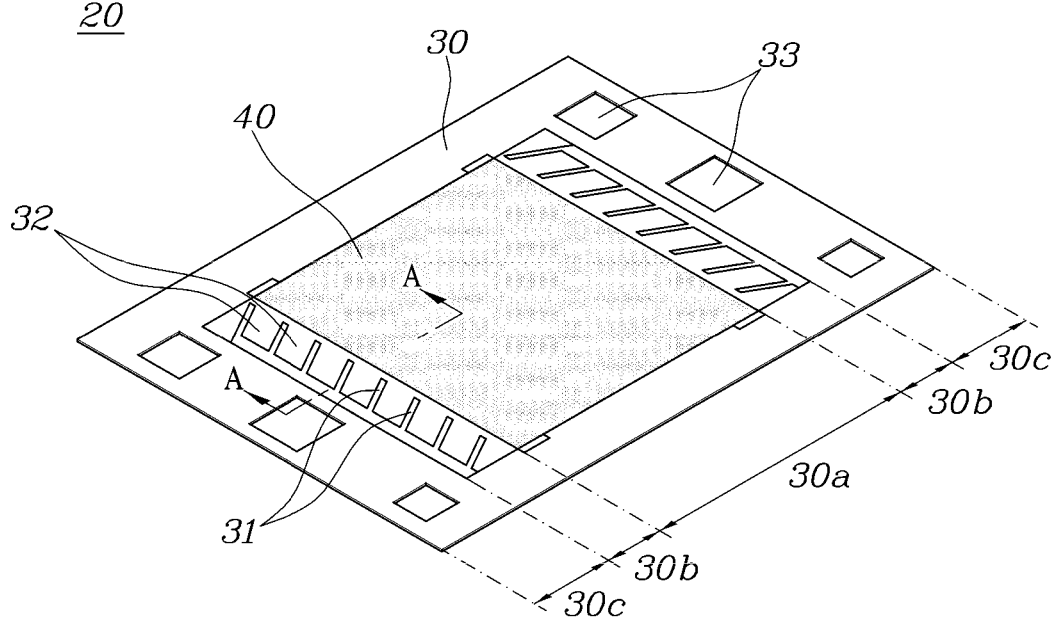
FIG. 2A is a perspective view showing the general porous separator.
Figure 2B:
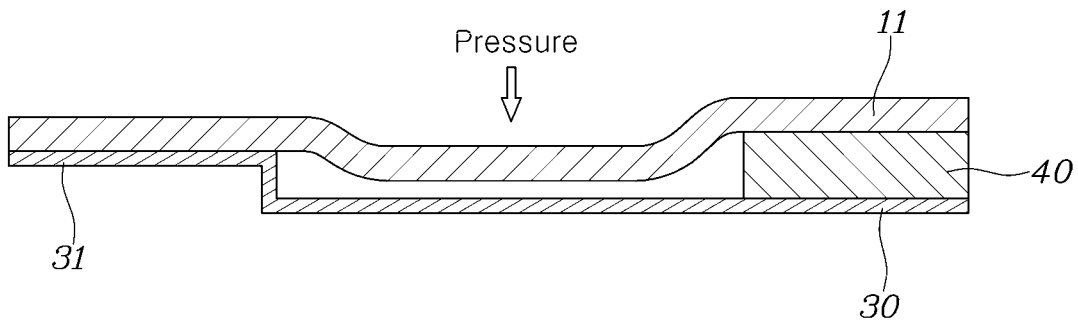
FIG. 2B is a cross-sectional view showing an essential portion of the general porous separator.
Figure 3:
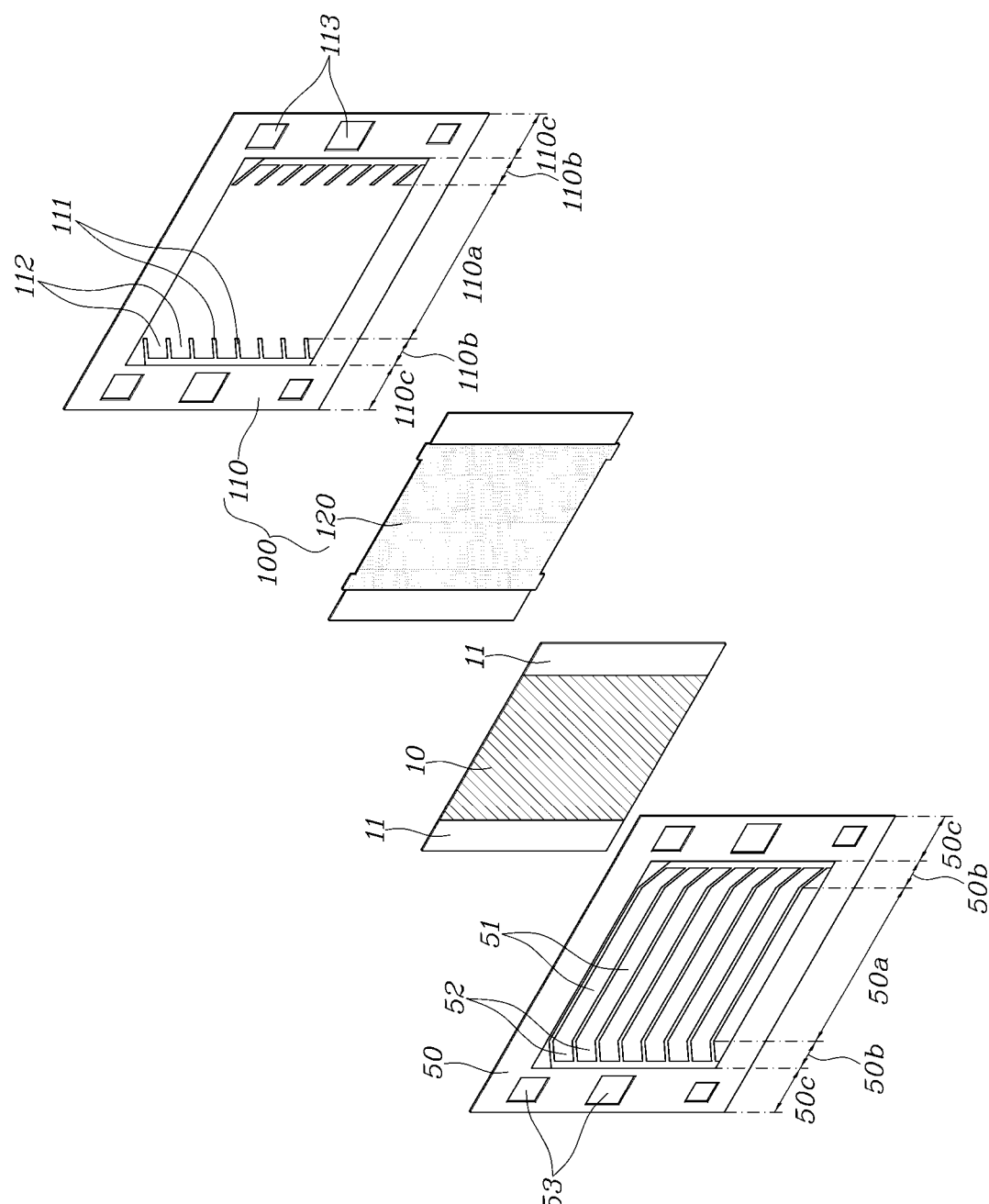
FIG. 3 is an exploded perspective view showing a unit cell for fuel cells to which a porous separator module is applied.
Figure 4:
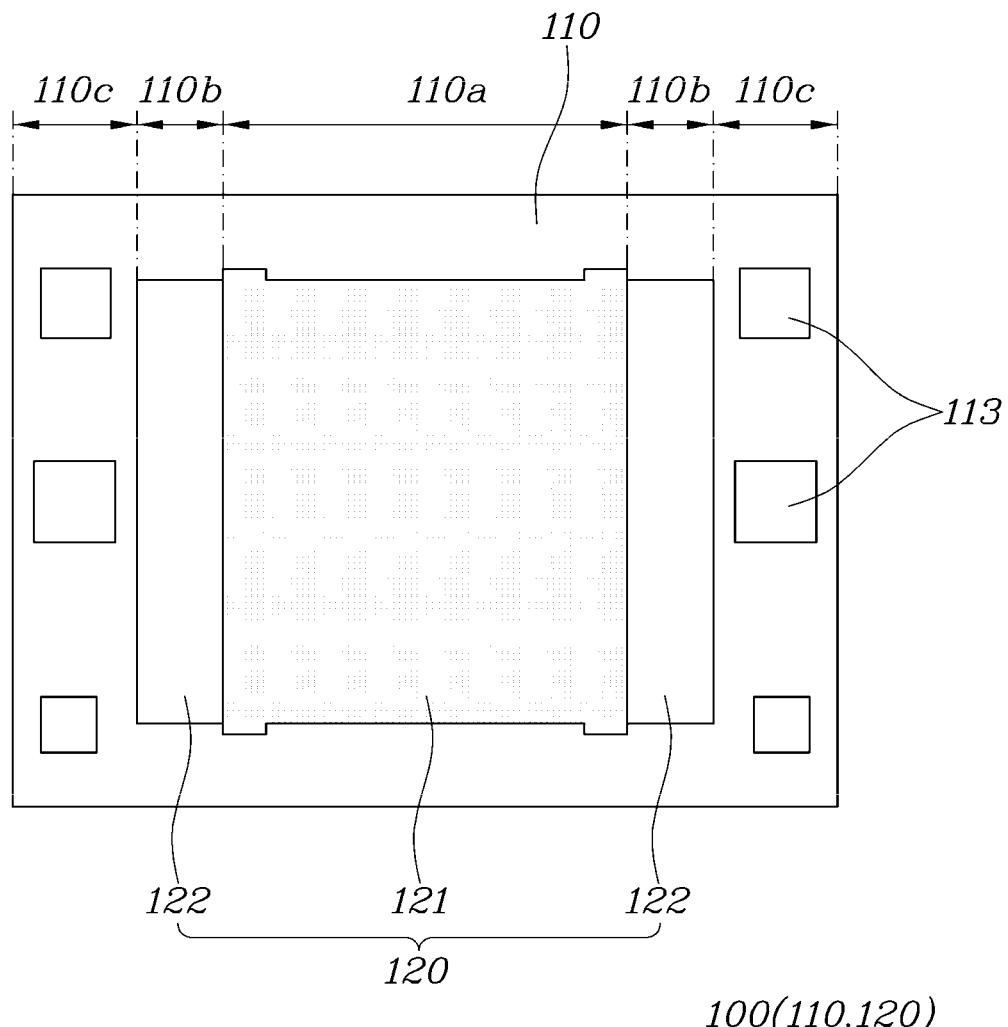
FIG. 4 is a plan view showing the porous separator module.
Figure 5:
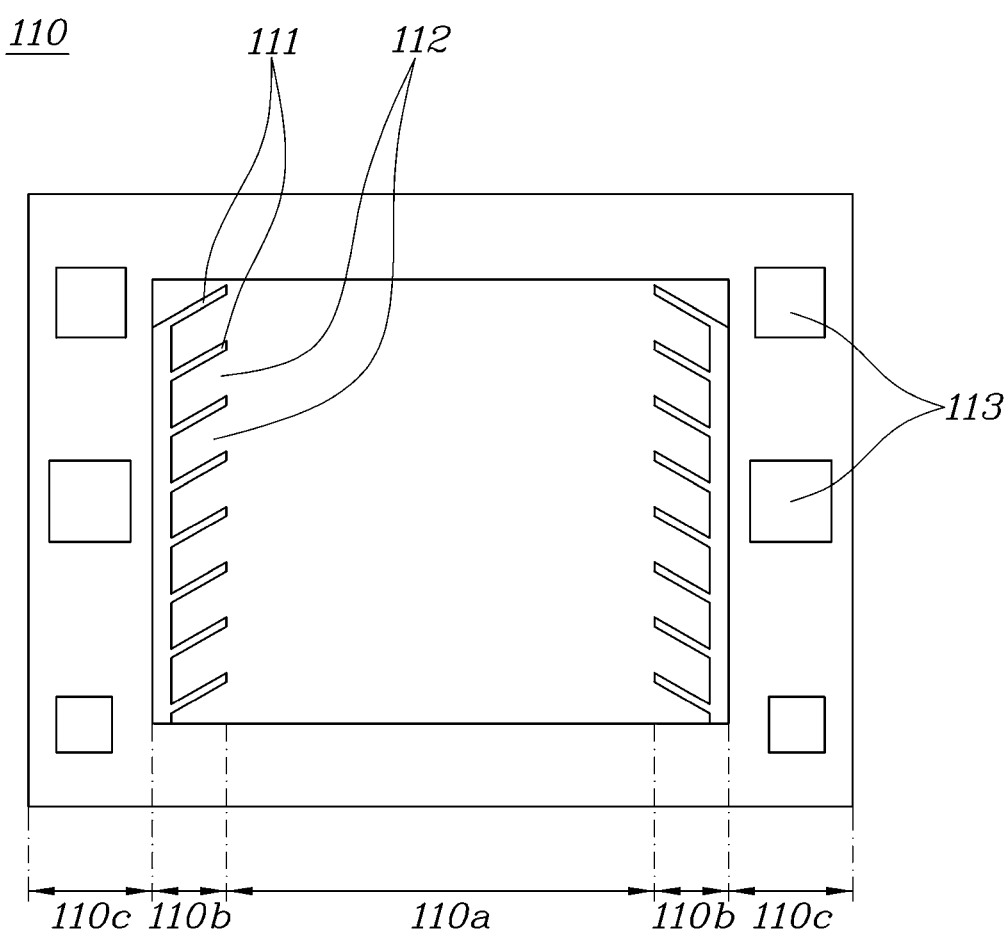
FIG. 5 is a plan view showing a separator main body of the porous separator module.
Figure 6:
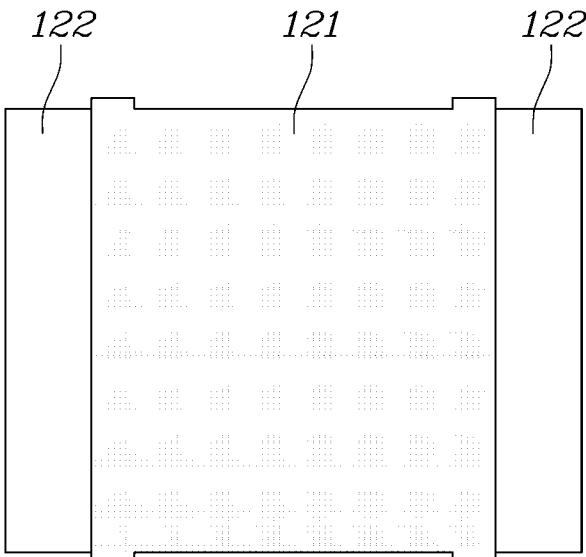
FIG. 6 is a plan view showing a porous body of the porous separator module.
Figure 7A:
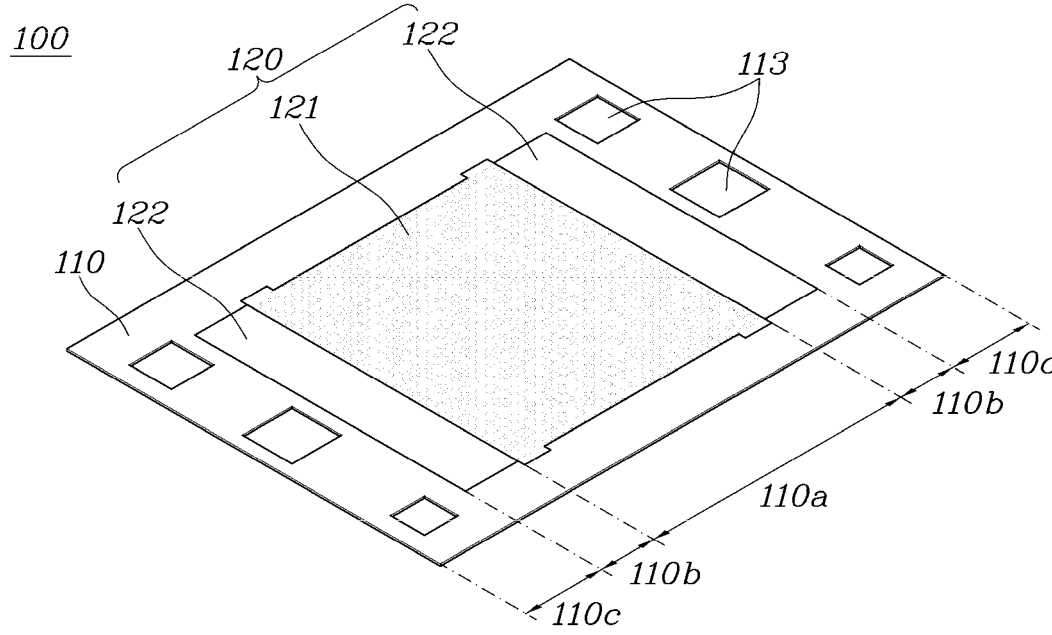
FIG. 7A is a perspective view showing the porous separator module.
Figure 7B:
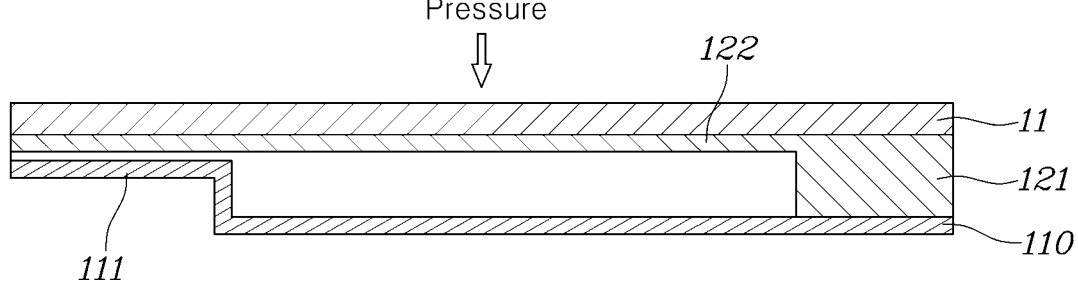
FIG. 7B is a cross-sectional view showing an essential portion of the porous separator module.

FIG. 3 is an exploded perspective view showing a unit cell for fuel cells to which a porous separator module according to one implementation of the present disclosure is applied, FIG. 4 is a plan view showing the porous separator module according to one implementation of the present disclosure, FIG. 5 is a plan view showing a separator main body of the porous separator module according to one implementation of the present disclosure, FIG. 6 is a plan view showing a porous body of the porous separator module according to one implementation of the present disclosure, FIG. 7A is a perspective view showing the porous separator module according to one implementation of the present disclosure, and FIG. 7B is a cross-sectional view showing an essential portion of the porous separator module according to one implementation of the present disclosure.

As shown in these figures, a unit cell for fuel cells according to one implementation of the present disclosure improves the shape of a porous body of a porous separator module 100 applied as a cathode separator while maintaining the configuration of the unit cell for fuel cells to which the general porous separator is applied, thereby preventing flow spaces in main body diffusion parts 110b of a separator main body 110 from being clogged due to a pressure difference.

For example, the unit cell for fuel cells according to the present disclosure, as shown in FIG. 3, includes a membrane-electrode assembly (MEA) 10, a pair of gas diffusion layers (GDLs) disposed on both surfaces of the MEA 10, and a pair of separators 100 and 50 disposed outside the pair of GDLs. Here, among the pair of separators 100 and 50, a porous separator 100 is applied as at least one separator, preferably, a cathode separator.

The MEA 10, the GDLs and a flow channel-type separator 50 applied as an anode separator are the same as the MEA 10, the GDLs and the flow channel-type separator 50 applied as the anode separator in the unit cell for fuel cells to which the above-described general porous separator is applied, and a detailed description thereof will thus be omitted.

However, in the same manner as the unit cell for fuel cells to which the above-described general porous separator is applied, in this implementation, in order to easily handle the MEA 10 and to facilitate alignment and adhesion of the MEA 10 with and to the separators 100 and 50, sub-gaskets 11 which surround and support the edge of the MEA 10 are provided.

The porous separator module 100 applied as the cathode separator includes the flat plate-type separator main body 110, and a porous body 120.

In more detail, the separator main body 110 serves as a sealing partition configured to divide a region in which reaction gas flows, as shown in FIG. 5, and includes a pair of manifold parts 110*c* formed at both ends of the separator main body 110 and having a plurality of manifolds 113 configured such that the reaction gas is introduced thereinto and discharged therefrom, a main body reaction part 110*a* formed between the pair of manifold parts 110*c* such that the reaction gas flows in the main body reaction part 110*a*, and a pair of main body diffusion parts 110*b* formed between the main body reaction part 110*a* and the pair of manifold parts 110*c* such that the reaction gas is diffused in the main body diffusion parts 110*b*.

Here, diffusion lands 111 serving as supports and diffusion channels 112 serving as flow paths of the reaction gas are alternately formed in the main body diffusion parts 110*b*, so as to allow the reaction gas to be gradually diffused while flowing in the direction toward the main body reaction part 110*a*.

Further, the porous body 120 serves to induce smooth diffusion and flow of the reaction gas, and is disposed on one surface of the separator main body 110, preferably, one surface of the separator main body 110 which is pressed against the MEA 10, in a region corresponding to the main body reaction part 110*a* and the pair of main body diffusion parts 110*b* of the separator main body 110.

For this purpose, the porous body 120 is divided into a porous body reaction part 121 formed in a region corresponding to the main body reaction part 110*a* of the separator main body 110, and porous body diffusion parts 122 configured to extend from both ends of the porous body reaction part 121 up to regions corresponding to the main body diffusion parts 110*b* of the separator main body 110, as shown in FIG. 6.

The porous body reaction part 121 is a part corresponding to the porous body 40 of the above-described general porous separator 20, and a plurality of flow holes through which the reaction gas passes is formed in the porous body reaction part 121.

For example, the porous body reaction part 121 has a waveform cross-section in the flow direction of the reaction gas, and the flow holes through which the reaction gas passes are formed in a zigzag pattern in the porous body reaction part 121. Here, the porous body reaction part 121 is formed to have a shape and a size corresponding to the main body reaction part 110*a* of the separator main body 110, and is adhered between the main body reaction part 110*a* of the separator main body 110 and the MEA 10.

The porous body diffusion parts 122 are formed to have a shape and a size corresponding to the main body diffusion parts 110*b* of the separator main body 110, and are adhered between the main body diffusion parts 110*b* of the separator main body 110 and the sub-gaskets 11.

The porous body diffusion parts 122 may be formed in the shape of a flat plate so as to be adhered between the main body diffusion parts 110*b* of the separator main body 110 and the sub-gaskets 11. Thereby, one surface of each of the porous body diffusion parts 122 may come into surface contact with a corresponding one of the sub-gaskets 11 throughout all areas while facing the sub-gasket 11.

When one surface of each of the porous body diffusion parts 122 comes into surface contact with a corresponding one of the sub-gaskets 11 throughout all areas while facing the sub-gasket 11, as shown in FIG. 7B, deformation of the sub-gaskets 11 towards spaces, in which the diffusion channels 112 of the main body diffusion parts 110*b* are formed, due to a pressure difference between the porous separator module 100 applied as the cathode separator and the flow channel-type separator 50 applied as the anode separator may be prevented.

Thereby, clogging of the diffusion channels 112 of the main body diffusion parts 110*b* may be solved, and thus, smooth flow of the reaction gas may be secured.

Further, in the present disclosure, the shape of the porous body diffusion parts 122 of the porous body 120 may be variously changed.

Particularly, surface pressure imbalance occurring due to a height difference between the porous body 120 and the main body diffusion parts 110*b* may be solved by freely controlling the height of the porous body diffusion parts 122.

Further, in order to secure production efficiency and uniform surface pressure distribution of the porous body 120, a plurality of flow holes may be formed in the porous body diffusion parts 122 of the porous body 120 in the same manner as the flow holes formed in the porous body reaction part 121.

In addition, in order to increase diffusion of the reaction gas and to improve structural rigidity of the porous body 120 while increasing the weight of the porous body 120, punched holes 123 may be formed through the porous body diffusion parts 122 of the porous body 120.

Figure 8:
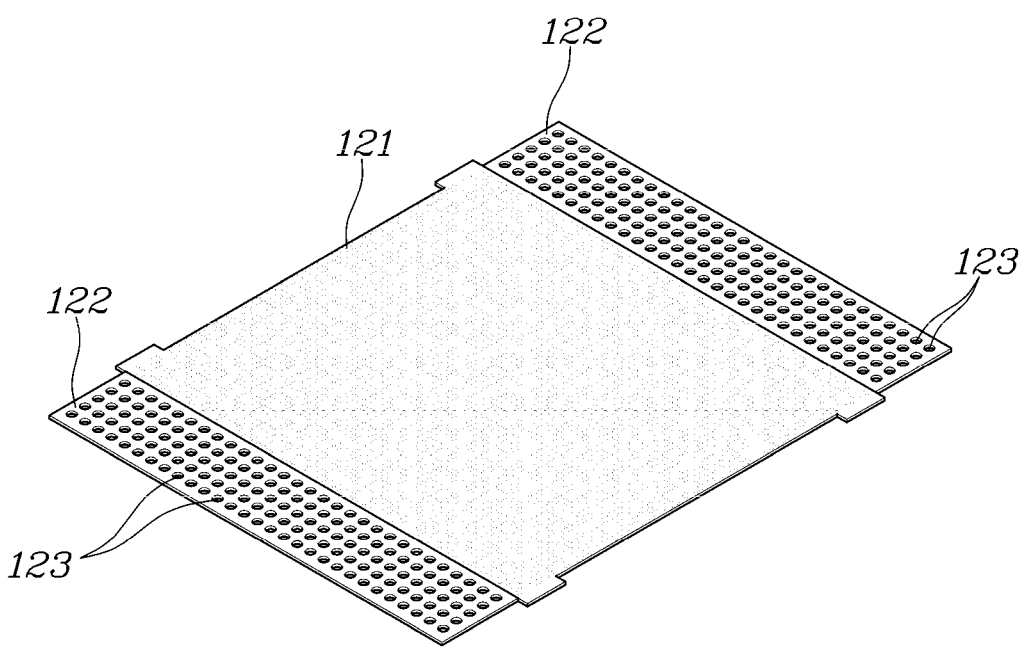
FIG. 8 is a perspective view showing a porous body of a porous separator module.

FIG. 8 is a perspective view showing a porous body of a porous separator module according to another implementation of the present disclosure.

As shown in FIG. 8, a plurality of flow holes may be formed in the porous body reaction part 121 of the porous body 120, and a plurality of punched holes 123 configured to pass through one surface and the other surface of the porous body 120 may be formed in the porous body diffusion parts 122 of the porous body 120. The punched holes 123 are formed in a regular pattern, thereby being capable of increasing diffusion of the reaction gas, and improving structural rigidity of the porous body 120 while reducing the weight of the porous body 120.

As is apparent from the above description, a separator module for fuel cells and a unit cell for fuel cells including the same according to implementations of the present disclosure may have the following effects.

First, the separator module for fuel cells may prevent reaction gas flow spaces from being clogged by sub-gaskets, thereby being capable of preventing pressure loss and distribution deterioration.

Second, the separator module for fuel cells may solve surface pressure imbalance occurring due to a height difference between a porous body and main body diffusion parts by controlling the height of porous body diffusion parts.

Third, the separator module for fuel cells may prevent the sub-gaskets from shaking due to a pressure difference between a porous separator module applied as a cathode separator and a flow channel-type separator applied as an anode separator.

Although the exemplary implementations of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A unit cell for fuel cells, comprising:
a membrane-electrode assembly (MEA);
a pair of gas diffusion layers (GDLs) disposed at both surfaces of the MEA; and
a pair of separators disposed at an outside of the pair of GDLs,
wherein at least one separator of the pair of separators is provided as a porous separator module; and
wherein the porous separator module comprises:
    a separator main body comprising (i) a pair of manifold parts disposed at both ends of the separator main body and (ii) a plurality of manifolds configured to receive or discharge reaction gas;
    a main body reaction part disposed between the pair of manifold parts and configured to receive the reaction gas;
    a pair of main body diffusion parts disposed between the main body reaction part and the pair of manifold parts, and configured to diffuse the reaction gas; and
    a porous body disposed at a surface of the separator main body in a region corresponding to the main body reaction part and the pair of main body diffusion parts,
wherein the porous body comprises:
    a porous body reaction part disposed at a region corresponding to the main body reaction part, and having a plurality of flow holes configured to pass the reaction gas therethrough; and
    a pair of porous body diffusion parts extending from both ends of the porous body reaction part up to regions corresponding to the main body diffusion parts,
wherein a plurality of diffusion channels and a plurality of diffusion lands are alternately disposed at the main body diffusion parts,
wherein the plurality of diffusion channels are configured to diffuse the reaction gas in a direction toward the main body reaction part and the plurality of diffusion lands are configured to support the pair of porous body diffusion parts,
wherein the unit cell further comprises a pair of sub-gaskets that surround and support an edge of the MEA and that are provided in regions corresponding to the pair of main body diffusion parts,
wherein each of the pair of porous body diffusion parts is disposed between one of the pair of main body diffusion parts and one of the pair of sub-gaskets, and
wherein one surface of each of the pair of porous body diffusion parts comes into surface contact with a corresponding one of the pair of sub-gaskets throughout all areas of the one surface while facing the corresponding one of the pair of sub-gaskets.

2. The unit cell according to claim 1, wherein the pair of porous body diffusion parts are formed in a shape of a flat plate.

3. The unit cell according to claim 2, wherein the pair of porous body diffusion parts comprise the plurality of flow holes configured to pass the reaction gas therethrough.

4. The unit cell according to claim 2, wherein a plurality of punched holes are defined in the pair of porous body diffusion parts and pass through the porous body.

5. The unit cell according to claim 1, wherein a waveform pattern is repeatedly defined in a flow direction of the reaction gas and the plurality of flow holes are defined in a zigzag pattern in the flow direction of the reaction gas at the porous body reaction part of the porous body.

* * * * *